United States Patent [19]

Ichinose et al.

[11] 4,419,613

[45] Dec. 6, 1983

[54] APPARATUS FOR INTERMITTENTLY DRIVING ENDLESS BELT IN AUTOMATIC SCREEN PRINTING MACHINE

[75] Inventors: Shiro Ichinose, Kobe; Saneto Machida, Nishinomiya; Shotoku Murakami; Teruo Furusawa, both of Iruma, all of Japan

[73] Assignee: Toshin Kogyo Co. Ltd., Hyogo, Japan

[21] Appl. No.: 340,035

[22] Filed: Jan. 18, 1982

[51] Int. Cl.³ .......... G05D 23/275

[52] U.S. Cl. .......... 318/632; 318/39; 318/603

[58] Field of Search .......... 318/632, 162, 6, 7, 318/39, 571, 603

[56] References Cited

U.S. PATENT DOCUMENTS 4,099,113 7/1978 Hayashi .......... 318/632
4,137,487 1/1979 Niestros et al. .......... 318/39
4,251,761 2/1981 Inoue .......... 318/632 X
4,296,365 10/1981 Yoshikawa .......... 318/632
4,324,499 4/1982 Giacone .......... 318/603 X
4,366,753 1/1983 Glanz .......... 318/603 X

*Primary Examiner*—B. Dobeck
*Attorney, Agent, or Firm*—Sherman & Shalloway

[57] ABSTRACT

An apparatus for intermittently driving an endless belt by two electric motors in an automatic screen printing machine, which comprises a pair of rollers, an endless belt supported on the rollers, a direct current electric motor for intermittently driving said rollers and a control mechanism for setting a repeat length of the endless belt while converting it to a pulse number, detecting the actual feed length of the endless belt as a pulse number and subtracting the detected pulse number from the set pulse number to stop the endless belt at the repeat length corresponding to the set pulse number.

2 Claims, 6 Drawing Figures

APPARATUS FOR INTERMITTENTLY DRIVING ENDLESS BELT IN AUTOMATIC SCREEN PRINTING MACHINE

BACKGROUND OF THE INVENTION (1) Field of the Invention

The present invention relates to an apparatus for intermittently driving an endless belt in an automatic screen printing machine. More particularly, the present invention relates to an apparatus for intermittently driving an endless belt in an automatic screen printing machine, in which the precision of feeding of the endless belt is enhanced irrespectively of non-uniform mechanical properties of the endless belt which are due to the uneven thickness and other factors.

(2) Description of the Prior Art

As the apparatus for intermittently driving a printing endless belt by a direct current electric motor, there has been known an apparatus comprising a direct current electric motor for intermittently driving an endless belt, a switch for setting a repeat length of the endless belt while converting it to a pulse number, a pulse generator for detecting as a pulse number the actual feed length of the endless belt according to displacement of the endless belt, a digital display device for displaying the repeat length detected by said detecting mechanism in the form of a numerical figure, a digital control mechanism for generating a starting signal, an acceleration signal, a constant speed signal or a speed reduction and stop signal according to the pulse number set by said switch and an electric motor control mechanism for controlling an input to said direct current electric motor according to the signal from the digital control mechanism to start the electric motor, accelerate the electric motor, drive the electric motor at a constant speed or decelerate and stop the electric motor, wherein said digital control mechanism comprises a computing mechanism for subtracting the detected pulse number from the set pulse number and generating a speed reduction signal so that the endless belt is stopped at a repeat length corresponding to the set pulse number [see Japanese Patent Application Laid-Open Specification No. 3448/79 (Japanese Patent Publication No. 24427/80)].

In this intermittent drive apparatus, the mechanical feed precision is excellent. However, the feed error due to the endless belt per se is indispensable because the endless belt is ordinarily composed of a reinforced rubber or the like and is not a rigid member.

This feed error of the endless belt is due to non-uniform mechanical properties owing to the uneven thickness and other factors. Especially in case of intermittent feeding, the feed error is caused by the difference of the quantity of elongation at the respective starting times and the difference of the degree of contraction at the respective stopping times. Furthermore, in the case where of two supporting rollers, only the pulling roller is driven to start the endless belt as a whole at a stroke from the stopped state as in conventional techniques, the tension is concentrated on the pulling side of the endless belt, which is another cause of occurrence of the feed error of the endless belt.

SUMMARY OF THE INVENTION

It is therefore a primary object of the present invention to provide an apparatus for intermittently driving an endless belt in an automatic screen printing machine, in which the tension on the endless belt is not concentrated but dispersed at the time of starting the endless belt and the precision of feeding of the endless belt can be enhanced irrespectively of non-uniform mechanical properties of the endless belt which are due to the uneven thickness and other factors.

In accordance with the present invention, there is provided an apparatus for intermittently driving an endless belt by two electric motors in an automatic screen printing machine, which comprises a pair of rollers, and endless belt supported on the rollers, a direct current electric motor for intermittently driving said rollers and a control mechanism for setting a repeat length of the endless belt while converting it to a pulse number, detecting the actual feed length of the endless belt as a pulse number and subtracting the detected pulse number from the set pulse number to stop the endless belt at the repeat length corresponding to the set pulse number, wherein each of the pulling and feed-out rollers supporting the endless belt is provided with a direct current electric motor capable of independently the roller, a pulse generator for detecting as a pulse number the actual feed length of the endless belt according to displacement of the roller and a digital servo mechanism for subtracting the detected pulse number from the set pulse number and reducing the speed of the direct current electric motor and stopping the same to stop the belt at the repeat length corresponding to the set pulse number, and a deviation comparing counter is arranged between the two pulse generators and at least one digital servo mechanism to compare the detected pulse number from the pulse generator on the pulling roller side with the detected pulse number from the pulse generator on the feed-out roller side and correct and control inputs to the electric motors according to the deviation, whereby any difference of the position is not produced between the two rollers at any moment during any mode of starting, running and speed reduction and therefore, no tension for driving is imposed on the endless belt.

DETAILED DESCRIPTION OF THE PREFERRED EMBODIMENT

The present invention will now be described in detail with reference to an embodiment illustrated in the accompanying drawings.

Figure 1:
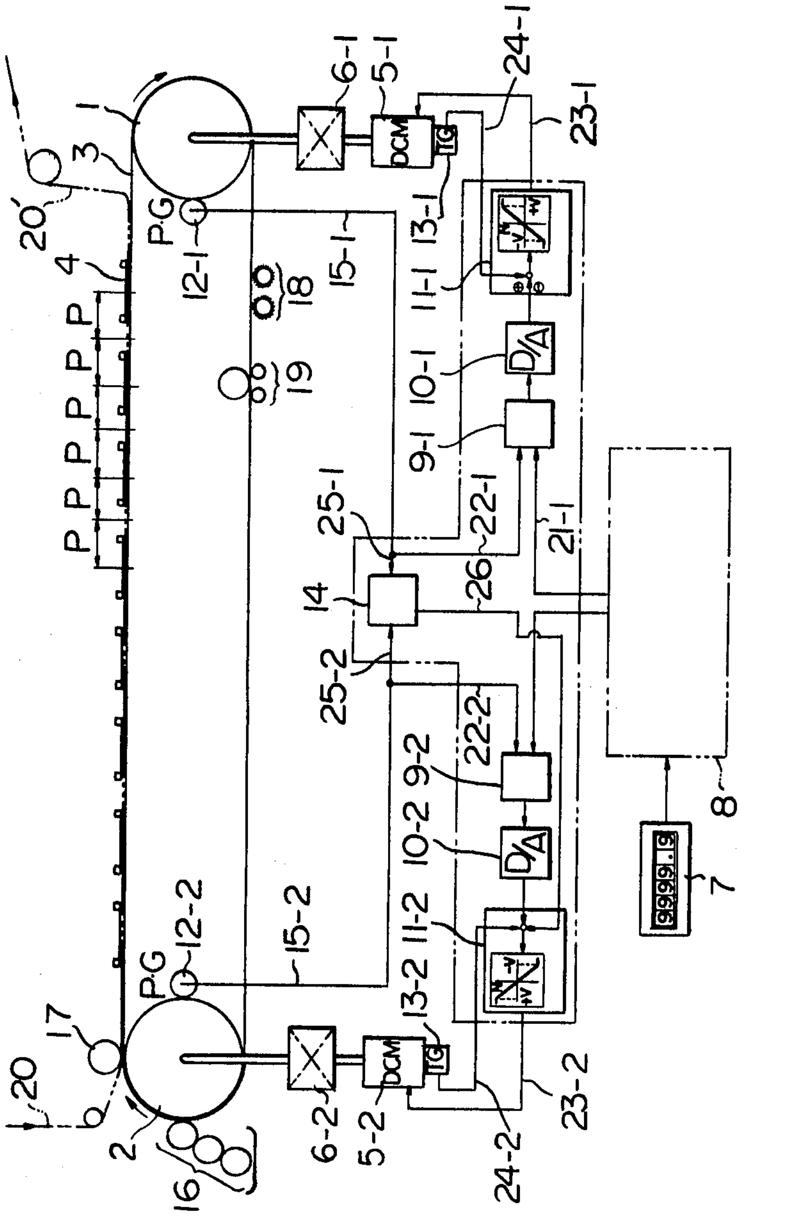
FIG. 1 is a side view illustrating arrangement of the apparatus for intermittently driving an endless belt according to the present invention.

Referring to FIG. 1, an endless belt 3 is laid out and supported between a pair of rollers, that is, a pulling roller 1 and a feed-out roller 2, and this endless belt is intermittently fed by a repeat length P and a cloth 20 to be printed, which is placed on the belt 3, is printed through a screen 4 by known printing means.

More specifically, a pasting device 16 is arranged in the vicinity of the feed-out roller 2 to apply a printing paste to the belt 3 and a pasting press roller 17 is arranged above the feed-out roller 2 so that the endless belt 3 is gripped between the rollers 2 and 17. The cloth 20 to be printed is fed between the press roller 17 and the belt 3 and is pasted on the belt 3. The endless belt 3 is intermittently fed by a predetermined repeat length. The screen 4 arranged above the upper running passage of the belt 3 is brought down onto the cloth 20 to be printed, and a squeegee (not shown) is scanned and moved to apply a color paste on the screen 4 to the cloth 20. Then, the screen 4 is elevated, and this cycle is repeated at a frequency corresponding to the number of colors to be printed on the cloth 20 and the printing operation is completed. The printed cloth 20' is separated from the endless belt 3 and fed to the subsequent step, for example, the drying step. The endless belt 3 is washed by a washing device 18 arranged along the lower running passage of the belt 3, and water is removed from the endless belt 3 by a water-removing device (mangle) 17. The above procedures are repeated.

In the intermittent driving apparatus of the present invention, a roller-driving direct current electric motor 5-1 is mounted for the pulling roller 1, if necessary, through a reduction gear 6-1, and a roller-driving direct current electric motor 5-2 is mounted for the feed-out roller 2, if necessary, through a reduction gear 6-2.

Pulse generators 12-1 and 12-2 are arranged for the driving rollers 1 and 2, respectively, to detect the actual feed length of the endless belt 3 on both the pulling and feed-out roller sides according to displacements of the rollers 1 and 2, so that these pulse generators 12-1 and 12-2 are driven and rotated without any slip through gear mechanisms (not shown) or the like. These pulse generators 12-1 and 12-2 may be connected to the rear portions of the motors.

Furthermore, there are disposed a repeat length setting switch 7 for setting and displaying the repeat length of the endless belt and a pulse converting mechanism (sequence computing circuit) 8 for converting the set repeat length to a pulse number. Series of digital servo mechanisms 9-1, 10-1 and 11-1 and 9-2, 10-2 and 11-2 are mounted for the pulling roller 1 and the feed-out roller 2, respectively, to subtract the detected pulse numbers supplied from the pulse generators 12-1 and 12-2 from the set pulse number supplied from the mechanism 8 and stop the direct current electric motors 5-1 and 5-2 so as to stop the belt 3 at the repeat length corresponding to the set pulse number.

Each series of the servo mechanisms comprises a deviation counter 9-1 (9-2), a digital/analog converter 10-1 (10-2) and an electric motor control mechanism 11-1 (11-2). The set pulse number from the pulse converting mechanisn 8 is fed to the deviation counter 9-1 (9-2) through a line 21-1 (21-2) and the detected pulse number from the pulse generator 12-1 (12-2) is fed to the deviation counter 9-1 (9-2) through lines 15-1 and 22-1 (15-2 and 22-2), and in the deviation counter 9-1 (9-2), compution of subtracting the detected pulse number from the set pulse number is performed. The computed pulse generated from the counter 9-1 (9-2) is converted to a voltage by the digital/analog converter 10-1 (10-2), and this voltage signal is supplied to the electric motor control mechanism 11-1 (11-2) and a predetermined electric input is fed to the direct current electric motor 5-1 (5-2) through a line 23-1 (23-2) to reduce the speed of the motor 5-1 (5-2) and stop the motor 5-1 (5-2) according to the set pulse number. A tachometer generator 13-1 (13-2) is attached to the direct current electric motor 5-1 (5-2) to detect the actual rotation speed of the electric motor 5-1 (5-2), and the detection signal of the tachometer generator 13-1 (13-2) is fed back to the electric motor control mechanism 11-1 (11-2) through a line 24-1 (24-2).

Figures 2A, 2B, 2C, 2D:
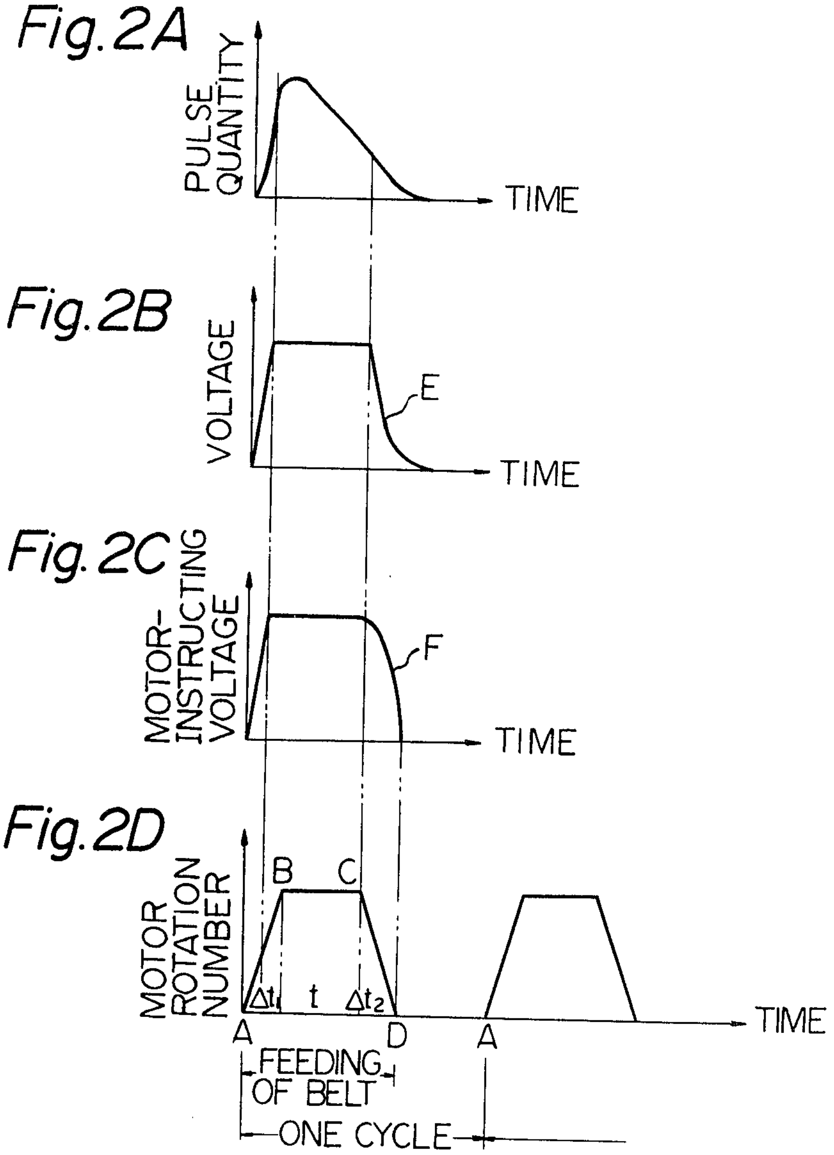
FIGS. 2-A, 2-B, 2-C and 2-D are time charts showing the computing pulse, the voltage generated at a digital/analog converter, the input to an electric motor and the feeding of an endless belt, respectively.

The relation between the detected pulse and the set pulse and the operations of the digital control mechanism and electric motor based on this relation will now be described with reference to times charts of FIGS. 2-A through 2-D. FIGS. 2-A, 2-B, 2-C and 2-D are diagrams illustrating the computed pulse, the voltage generated in the digital/analog converter, the input to the electric motor and the feeding of the belt, respectively.

At first, the difference between the pulse number L set as the repeat length by the switch 7 and pulse converting mechanism 8 and the detected pulse number R from the pulse generator 12-1 (12-2) is computed by the deviation counter 9-1 (9-2), that is, a computer.

The computed pulse number (L-R) is abruptly increased with initiation of driving of the electric motor, as shown in FIG. 2-A, and it is then decreased with increase of the rotation time.

The computed pulse number (L-R) is fed to the digital/analog converter 10-1 (10-2) and is converted to a voltage. However, in order to prevent reckless driving of the electric motor, the maximum value of the voltage is controlled to a certain level, as shown in FIG. 2-B.

As shown in FIG. 2-B, the generated voltage is expressed by an exponential function curve E. Since precise control becomes difficult if the time is prolonged, this curve is converted to a function or integration curve F as shown in FIG. 2-C.

Accordingly, the rotation of the electric motor, that is, the feeding of the belt, is performed along the line A-B-C-D, namely, the accelerated driving section AB, the constant speed driving section BC and the decelerated driving section CD. After this belt-feeding course, there is present the belt-stopping section DA. One cycle of the printing operation consists of these sections A-B, B-C, C-D and D-A. In FIG. 2-D, the area surrounded by the line A-B-C-D corresponds to the feed length of the belt.

According to the present invention, the abovementioned digital servo mechanism, pulse generator and direct current electric motor are disposed for each of the pulling roller and the feed-out roller, and the detected pulses from both the pulse generators are compared with each other and the inputs to the direct current motors are controlled according to the difference between the two detected pulses.

For embodying the above idea, in the embodiment shown in FIG. 1, the detected pulse number from the pulse generator 12-2 on the feed-out roller side is directly fed back to the deviation counter 9-2 on the feed-out roller side through the lines 15-2 and 22-2, and simultaneously, the detection signal from the pulse generator 12-2 on the feed-out roller side is supplied to the deviation comparing counter 14 through the lines 15-2 and 25-2 and the detection signal from the pulse generator 12-1 on the pulling roller side is supplied to the deviation comparing counter 14 through the lines 15-1 and 25-1. In this deviation counter 14, both the detected pulse numbers are compared with each other, and the difference is converted to a correcting voltage and this correcting voltage is supplied to the electric motor control mechanism 11-2 on the feed-out roller side through a line 26.

More specifically, the deviation comparing counter 14 compares the pulse number from the pulse generator 12-2 on the feed-out roller side with the pulse number from the pulse generator 12-1 on the pulling roller side, and when the pulse number on the feed-out roller side is different from the pulse number on the pulling roller side, the counter immediately controls the gate signal to the electric motor control mechanism 11-2 on the feed-out roller side, that is, the electric input to the electric motor 5-2 on the feed-out roller side, so that the detected pulse number of the pulse generator 12-1 is made equal to the detected pulse number of the pulse generator 12-2.

Figure 3:
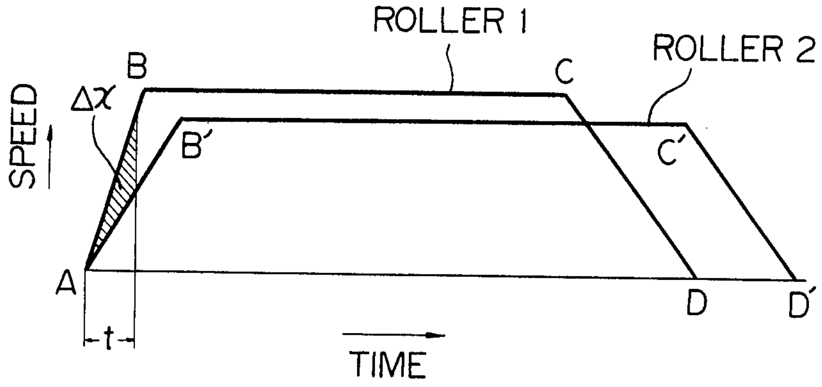
FIG. 3 shows time-speed diagrams for pulling and feed-out rollers.

In the case where the pulling roller 1 and the feed-out roller 2 are independently driven, even if the feed length of the roller 1 is equal to the feed length of the roller 2, it frequently happens that the time-speed diagram (ABCD) of the pulling roller 1 is different from the time-speed diagram (AB'C'D') of the feed-out roller 2 (incidentally, the area ABCD is equal to the area AB'C'D'), as shown in FIG. 3.

When the time-speed diagram of the pulling roller 1 is thus different from the time-speed diagram of the feed-out roller 2, even if the feed length as a whole is the same in both the rollers 1 and 2, an abnormal stress is imposed on the endless belt and it is difficult to maintain the feed precision correctly.

In the present invention, by the deviation comparing counter 14, the difference between the detected pulse number on the feed-out roller side and the detected pulse number on the pulling roller side is detected at every moment and the inputs to the electric motors are corrected so that in FIG. 3, the time-speed diagram ABCD is made equal to the time-speed diagram AB'C'D' with respect to not only the area (feed length) but also the trapezoidal shape. For example, supposing that the difference of the feed length between the two rollers, that is, the difference of area, is $\Delta x$ after the time t from the start of the feeding of the belt, the pulse number corresponding to this difference $\Delta x$ is added to the side of the feed-out roller 2 to effect correction. Of course, this correction is not performed after the lapse of the time t, but the correction is made at every moment for each pulse.

According to the present invention, as will be apparent from the foregoing description, the pulling roller 1 and the feed-out roller 2 are driven by different electric motors, the detected pulse numbers are independently subtracted from the set pulse number and the electric motors are stopped at the pulse number corresponding to the set pulse number. Simultaneously, the detected pulse number from the pulling roller is compared with the detected pulse number from the feed-out roller and the inputs to the electric motors are controlled according to the difference between the two detected pulse numbers. By virtue of such characteristic features, according to the present invention, the endless belt feed precision can be maintained at a very high level without imparting excessive tension or abnormal stress locally to the endless belt while reducing and controlling elongation or contraction of the endless belt.

Ordinarily, the pulse number to the repeat length is in the range of from 0.005 mm/pulse to 0.1 mm/pulse, and the precision of comparison and correction attainable in the deviation comparing counter 14 is $\pm 1$ pulse. The level of the correcting electric signal from the deviation comparing counter 14 can be freely adjusted by a variable resistor (not shown) according to the capacitance of the electric motor.

In the embodiment illustrated in the drawings, the pulling roller 1 is regarded as the main roller and the feed-out roller 2 is regarded as the subsidiary roller, and driving of the feed-out roller 2 is compared and corrected based on the pulse number generated from the side of the pulling roller 1. As is obvious to those skilled in the art, the above-mentioned characteristic features can similarly be attained even if the reverse structure is adopted.

The distribution of the capacitance between the direct current electric motors 5-1 and 5-2 is appropriately determined according to the size of the printing machine, that is, the load of the intermittent feeding of the endless belt, and other loads. For example, in the case where 7.5 KW is necessary for driving one roller alone as in the conventional techniques, this may be divided equally so the capacitance of 3.7 KW is distributed to each electric motor. Furthermore, it is possible to distribute 5.5 KW to the electric motor on the pulling roller side and 2.2 KW to the electric motor on the feed-out roller side. Of course, it is indispensable that the diameter of the pulling roller 1 should be equal to the diameter of the feed-out roller 2 and the rotation rate and pulse-generating number of the pulse generator 12-1 should be equal to those of the pulse generator 12-2. However, the difference of the processed dimension of the diameter can be adjusted and corrected, for example, by F/F conversion (frequency conversion) in the deviation counters 9-1 and 9-2.

What is claimed is:

1. An apparatus for intermittently driving endless belt by two electric motors in an automatic screen printing machine, which comprises a pair of rollers, an endless belt supported on the rollers, a direct current electric motor for intermittently driving said rollers and a control mechanism for setting a repeat length of the endless belt while converting it to a pulse number, detecting the actual feed length of the endless belt as a pulse number and subtracting the detected pulse number from the set pulse number to stop the endless belt at the repeat length corresponding to the set pulse number, wherein each of the pulling and feed-out rollers supporting the endless belt is provided with a direct current electric motor capable of independently the roller, a pulse generator for detecting as a pulse number and actual feed length of the endless belt according to displacement of the roller and a digital servo mechanism for subtracting the detected pulse number from the set pulse number and reducing the speed of the direct current electric motor and stopping the same to stop the belt at the repeat length corresponding to the set pulse number, and a deviation comparing counter is arranged between the two pulse generators and at least one digital servo mechanism to compare the detected pulse number from the pulse generator on the pulling roller side with the detected pulse number from the pulse generator on the feed-out roller side and correct and control inputs to the electric motors according to the deviation, whereby any difference of the position is not produced between the two rollers at any moment during any mode of starting, running and speed reduction and therefore, no tension for driving is imposed on the endless belt.

2. An apparatus as set forth in claim 1, wherein the digital servo mechanism comprises a deviation counter for subtracting the detected pulse number from the set pulse number, a digital/analog converter for converting the computed pulse from the deviation counter to a voltage and an electric motor control mechanism for stopping the electric motor at the set pulse number according to the voltage signal from the digital/analog converter, and said deviation comparing counter converts the difference between both the pulse numbers to a correcting voltage signal and feeds said voltage signal to the electric motor control mechanism.

* * * * *